Figure 1:
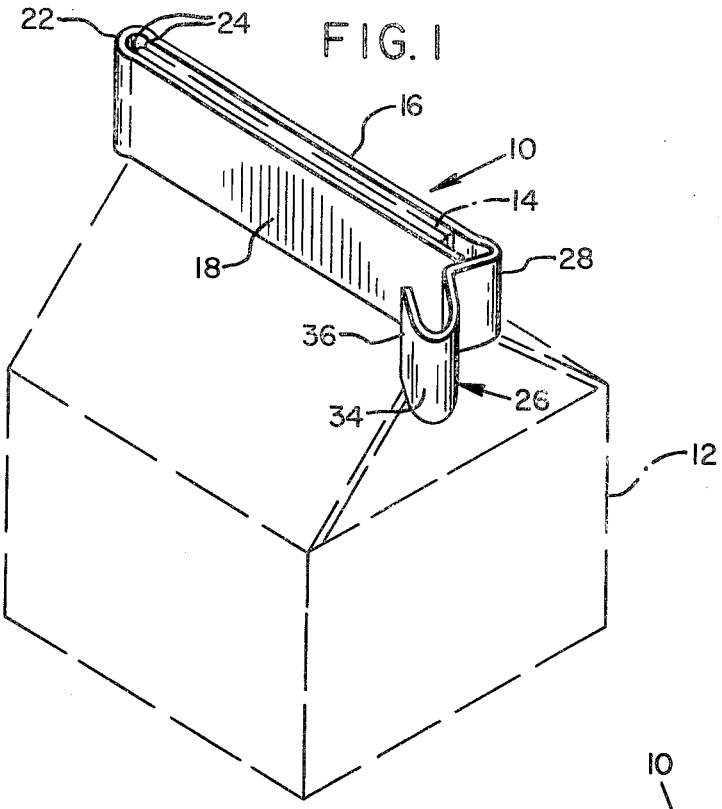
Figure 2:
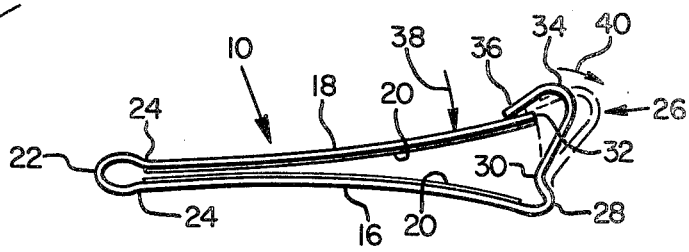
Figure 4:
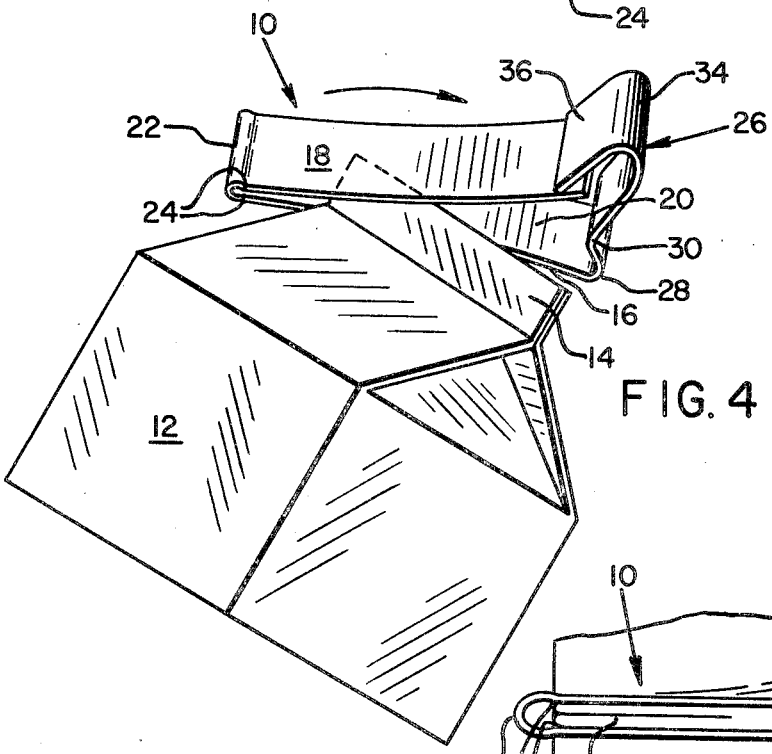
Figure 3:
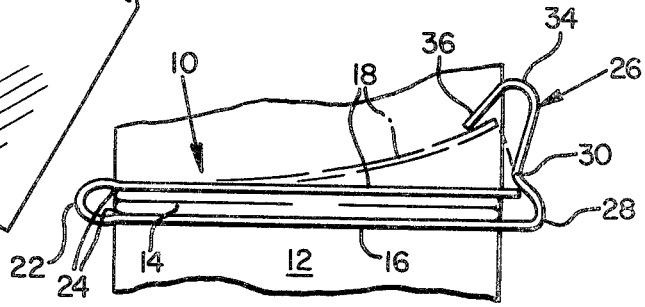

United States Defensive Publication [19] (H) [11] T983,001

Coffey [43] Jun. 5, 1979

[54] UNITARY CLAMP FOR RESEALING MILK CARTONS

[76] Inventor: Darius A. Coffey, 13613 Occidental Ave. South, Seattle, Wash. 98168

[21] Appl. No.: 898,868

[22] Filed: Apr. 21, 1978

[51] Int. Cl.[2] ..... A44B 21/00

[52] U.S. Cl. ..... 24/259 R; 24/30.5 R; 229/65

[57] ABSTRACT

A clamp for resealing an opened milk carton or similar container includes adjacent clamping legs interconnected by a resilient medial portion and movable relative to each other from a diverging position when the clamp is open to a substantially parallel relationship when the clamp is closed. A lever arm connected to one of the clamping legs overlaps the extremity of the other clamping leg to limit the distance by which the extremities of the clamping legs may be separated, and an elastically movable latch, located intermediate the free extremity of the lever arm and the end of the clamping leg to which the lever arm is attached, engages the extremity of the other clamping leg to retain the sealing clamp in its closed position. The clamp may be made from a single strip of sheet metal appropriately bent, or from other material having suitable elasticity and durability. High friction surfaces on the opposing or inner faces of the clamping legs resist displacement of the sealing clamp from a milk carton on which the clamp is closed.

9 Claims, 1 Sheet Drawing,

11 Pages Specification

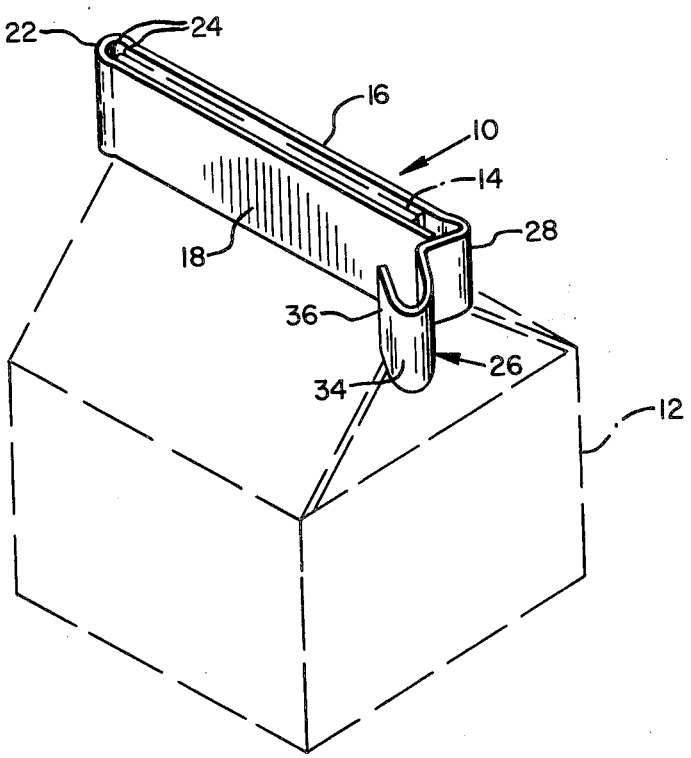

The file of this unexamined application may be inspected and copies thereof may be purchased (849 O.G. 1221, Apr. 9, 1968).